Aug. 3, 1926.
G. G. MORIN
1,594,629
SEMIAUTOMATIC TRIP FOR POWER SHOVELS
Filed July 6, 1925  4 Sheets-Sheet 1
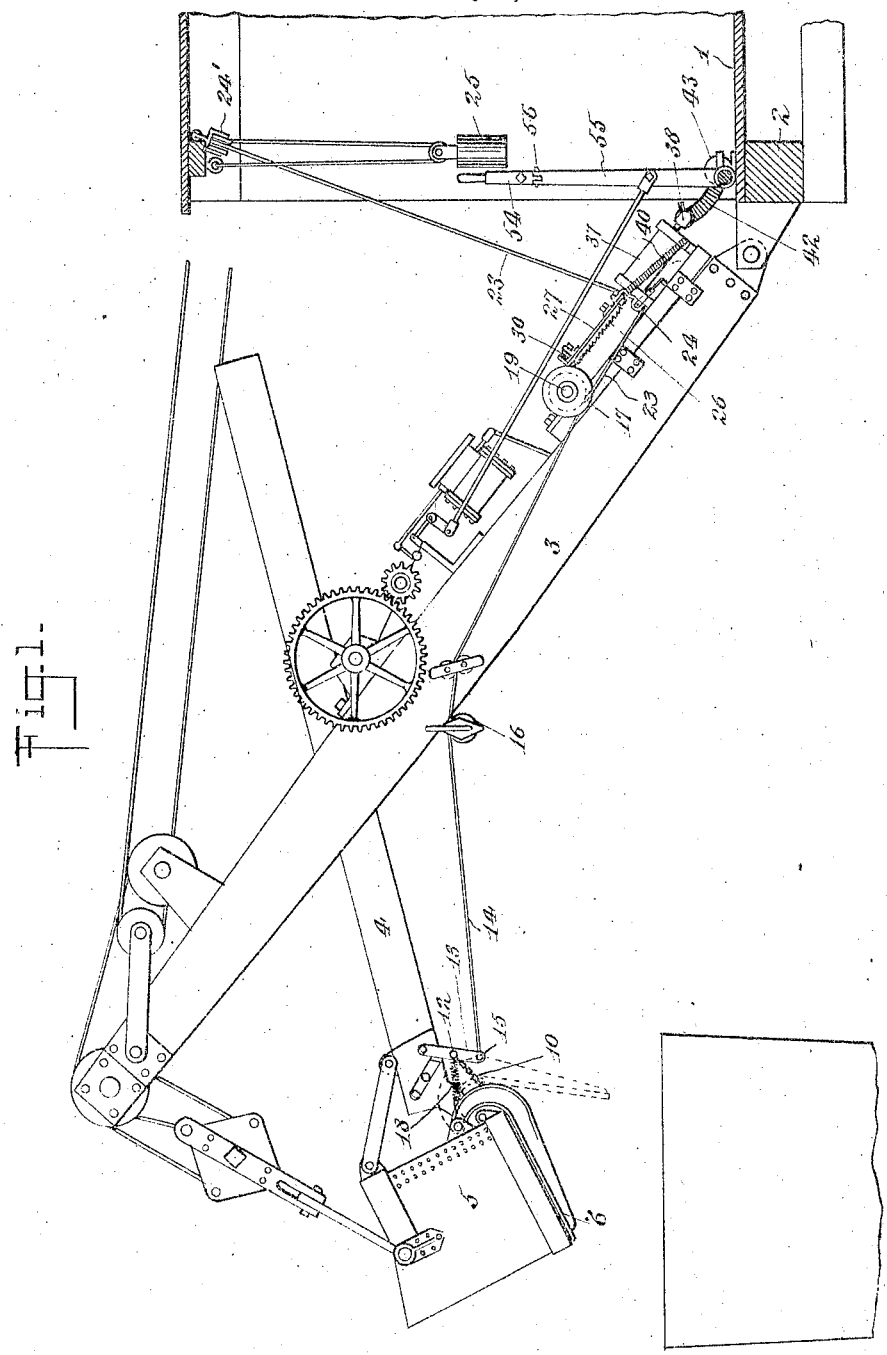
WITNESSES
INVENTOR
George G. Morin
BY
ATTORNEYS Aug. 3, 1926.  
G. G. MORIN  
1,594,629  
SEMIAUTOMATIC TRIP FOR POWER SHOVELS  
Filed July 6, 1925 4 Sheets-Sheet 2
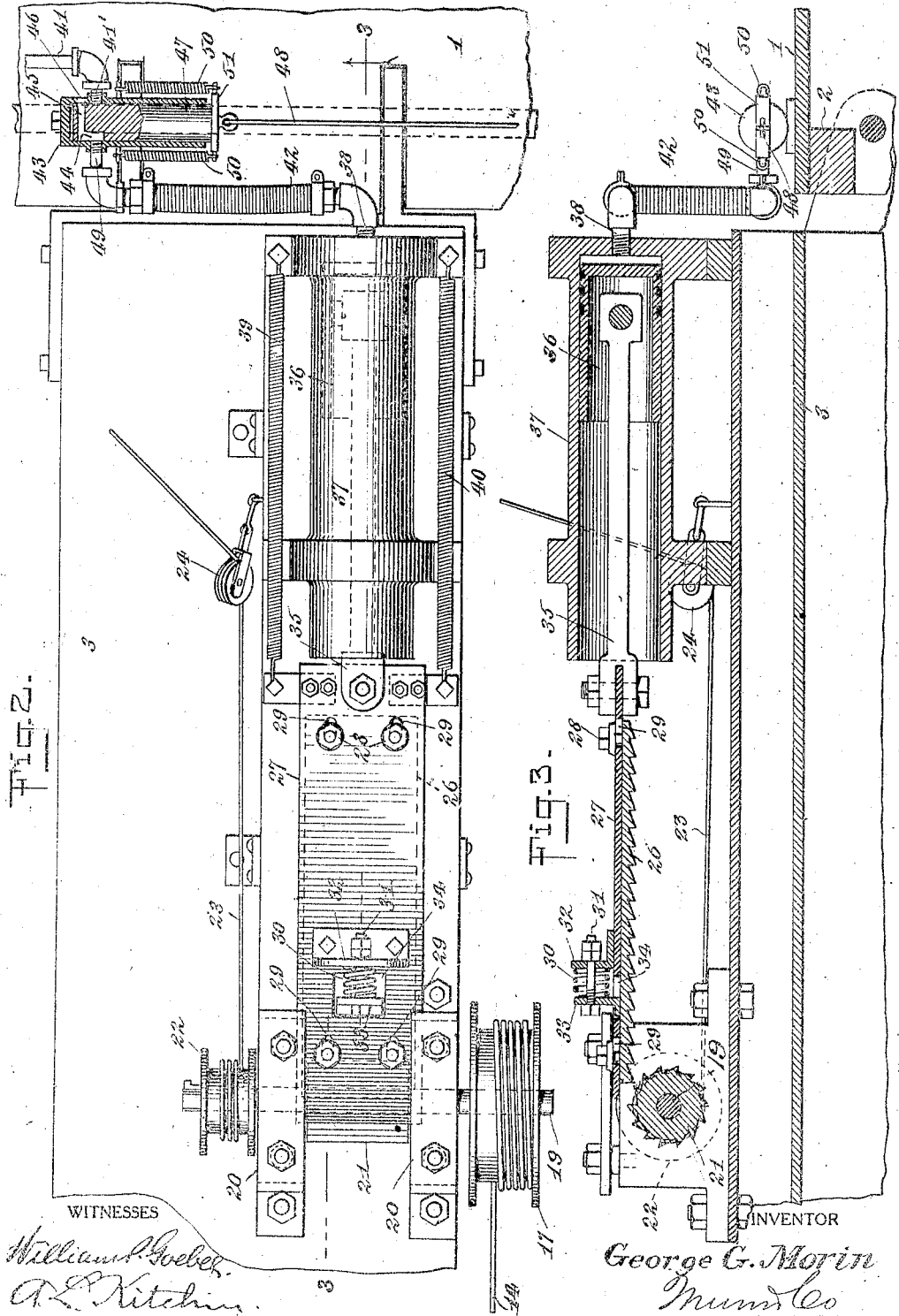

Aug. 3, 1926.
G. G. MORIN
1,594,629
SEMIAUTOMATIC TRIP FOR POWER SHOVELS
Filed July 6, 1925     4 Sheets-Sheet 3
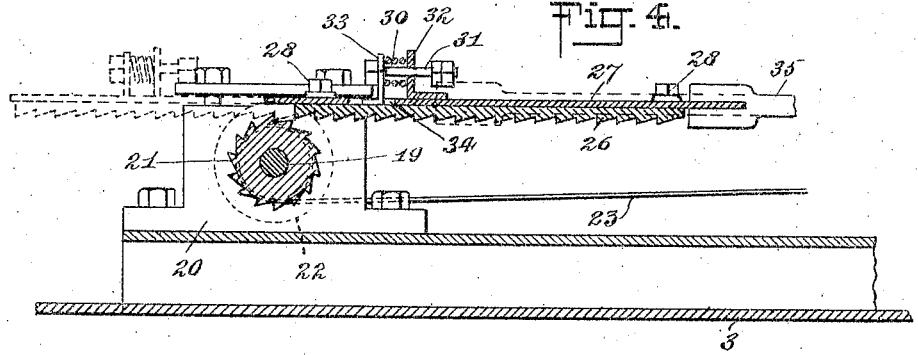
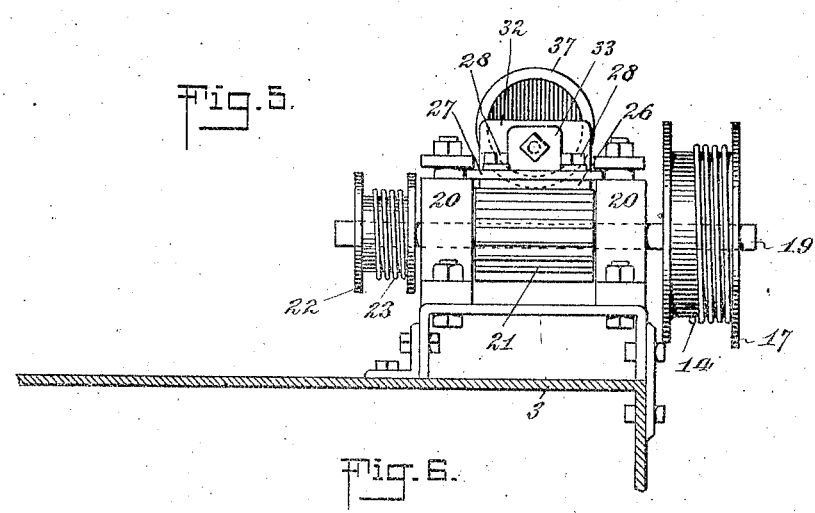
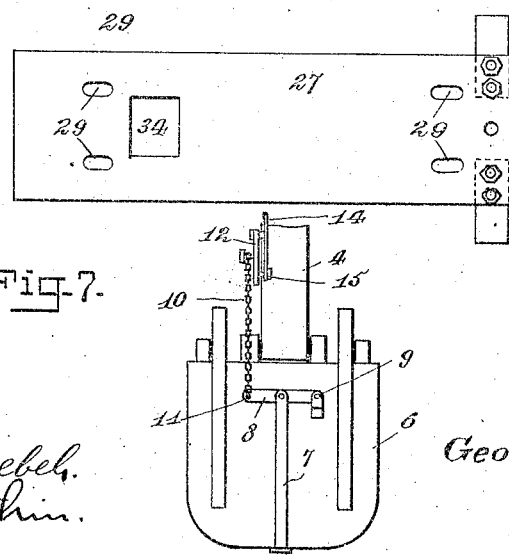
WITNESSES.
William P. Goebel.
A. L. Kitchin.
INVENTOR
George G. Morin
BY
ATTORNEYS

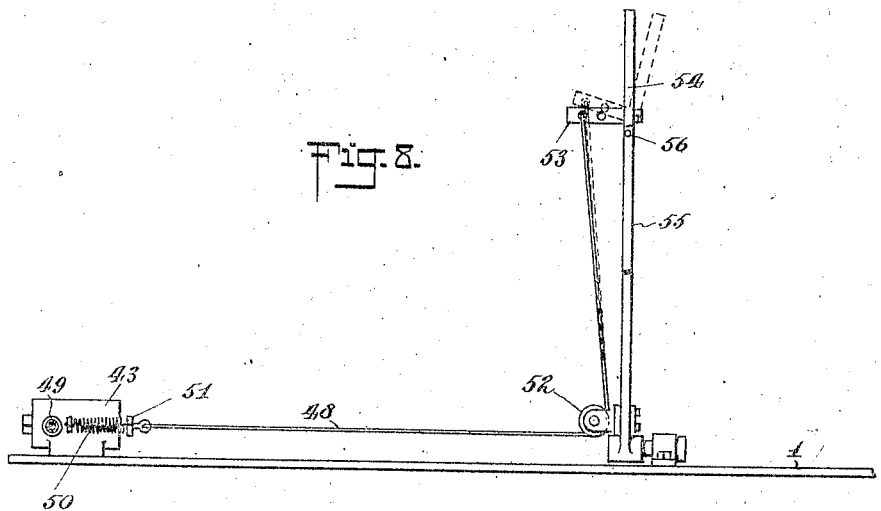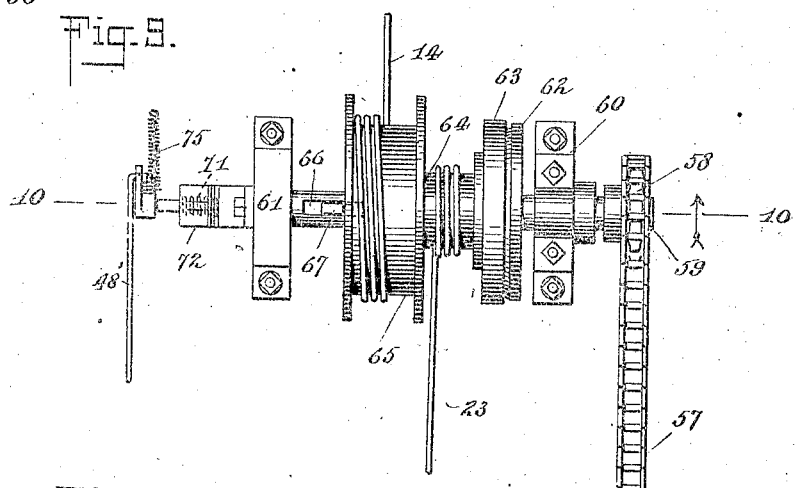

Patented Aug. 3, 1926.

1,594,629

UNITED STATES PATENT OFFICE.

GEORGE GEDEON MORIN, OF HOLYOKE, MASSACHUSETTS.

SEMIAUTOMATIC TRIP FOR POWER SHOVELS.

Application filed July 6, 1925. Serial No. 41,744.

This invention relates to tripping devices for power shovels and particularly to an improved semi-automatic trip capable of use with steam shovels, electrically driven shovels, gasoline driven shovels or other forms of shovels, the structure being such that the operator may not only cause a proper actuation of the shovel through the movement of the lever but may trip the shovel at any time through the movement of the lever.

The object of the invention is to provide a trip for power shovels which may be actuated at any time through the manipulation of the lever associated with the control lever of the shovel.

Another object of the invention is to provide a semi-automatic trip which is power operated and which is controlled through a lever structure near the operator of the shovel.

A further object, more specifically, is to provide a semi-automatic trip wherein steam or other power means may be used to cause the trip to be actuated and manually actuated structures positioned to be moved from the operator's stand whereby the steam or other power is turned on and off.

In the accompanying drawings—

Figure 1 is a side view of part of a steam shovel with certain parts broken away, there being an embodiment of the invention applied to the shovel.

Figure 2 is an enlarged top plan view of the steam power member shown in Figure 1.

Figure 3 is a sectional view through Figure 2, approximately on line 3—3.

Figure 4 is a view similar to the left hand portion of Figure 3 but showing the parts in a different position.

Figure 5 is a front view of the structure shown in Figure 2.

Figure 6 is a plan view of the rack carrying plate shown in Figures 2 and 3.

Figure 7 is a bottom plan view of the shovel and associated parts shown in Figure 1.

Figure 8 is a fragmentary front view of the power control lever and associated parts shown in Figures 1 and 2.

Figure 9 is a fragmentary top plan view of a trip operating mechanism, disclosing a modified form of the invention.

Figure 10 is a sectional view through Figure 9 on line 10—10.

As indicated in Figure 1, the invention has been shown applied to a steam shovel of a well known type. The shovel shown is provided with a cab 1 mounted on a suitable supporting structure 2 to which the beam 3 is pivotally connected so as to swing upwardly and downwardly and also to the right or left. Co-acting with the beam 3 is a member 4 carrying a shovel 5. The shovel 5 is provided with a bottom 6 having a bolt 7 of usual construction, which bolt is pivotally connected with an arm 8 pivotally mounted at 9. Heretofore, a rope was connected to one end of the arm 8 and was manually pulled at the proper time for releasing the bolt 7. In the present invention, however, the chain 10 is connected at 11 to arm 8, said chain at the opposite end being connected at 12 to a lever 13. A cable 14 is connected with lever 13 at 15, said cable passing over suitable guiding pulleys 16 and finally around the drum to which one end is secured. The drum 17 as hereinafter fully described is adapted to readily pay out or release cable 14 as shovel 5 is moved outwardly or downwardly. The drum 17 is also adapted to automatically wind the cable 14 when there is any slack so that the cable will be maintained under a certain tension at all times. To positively prevent this tension from causing the bolt 7 to be moved, the spring 18 is provided, connected at one end to arm 13 and at the other to some part of the shovel.

As indicated in Figures 2, 3 and 5, drum 17 is rigidly secured to a drum shaft 19, which shaft extends through suitable bearing blocks 20 and to which is rigidly secured ratchet wheel 21 and a small drum 22. One end of cable 23 is connected to drum 22 and preferably part of the cable 23 is continually wound on drum 22. The cable 23 extends through suitable guiding pulleys 24 to a position near the cab 1 and then over a pulley 24' so that the weight 25 acting on the cable may maintain the same taut. The weight 25 also acts as a power member for rotating drum 22, shaft 19 and drum 17 whenever there is any slack in cable 14 whereby the cable 14 will be maintained wound on its drum. The power of the weight 25, however, is not sufficient to put enough tension on cable 14 to cause the same to trip the bottom of the shovel 5. By this construction and arrangement, the shovel may be moved inwardly and outwardly freely without danger of tripping the bottom. Whenever desired, power can be applied to the drum shaft and the drums rotated sufficiently to cause the cable 14 to trip the shovel.

It will be noted that the two drum arrangement with the drums spaced on opposite sides of the boom is peculiarly desirable because it equalizes lateral stresses on the boom incidental to operation of the cable for tripping the bucket. The drum and cable arrangement permit the manual controlling member to be disposed within the covered cab of the excavating machine, and avoids the necessity for using heavy and ponderous linkage such as is employed with the usual types of automatic trips if the latter are controlled from the cab.

The power means for rotating the drum 17 is shown more particularly in Figures 2 to 5 inclusive. As indicated in the drawing, the rack 26 co-acts with the ratchet wheel 21 to rotate the ratchet wheel and associated parts whenever the rack has been moved under the action of steam. It will be noted that the rack 26 is connected to plate 27 by a number of bolts 28 which extend through suitable slots 29 near each end of the plate 27, said slots extending longitudinally of the plate whereby the plate is permitted a short movement before rack 26 is moved. This is to prevent the sudden shock caused by rack 26 striking the teeth of ratchet wheel 21. In order to provide a satisfactory cushioning effect, spring 30 is provided. This spring is held in position by the bolt 31 carried by the bracket 32 and 33. The bracket 32 is riveted or otherwise rigidly secured to plate 27 while the bracket 33 extends through the comparatively large aperture 34 and is bolted or riveted to the rack 26. One end of the plate 27 is connected with a piston rod 35, which piston rod is connected in any approved manner with the piston 36 positioned in the cylinder 37. When steam is admitted through the pipe 38, piston 36 will be moved to the left as shown in Figure 3 and this will move piston rod 35 and plate 27. The movement of plate 27 will compress spring 30 and as the tension increases on spring 30 it will move bracket 33 and rack 26 until rack 26 is engaging the teeth of the ratchet wheel 21. A continued movement of the piston 36 will cause the rack to quickly move out to the dotted position shown in Figure 4. However, the action of transmitting the power through spring 30 causes the rack to strike the ratchet wheel 21 with a cushion blow and thereby causes the ratchet wheel and associated parts to be started slowly, after which, a rapid movement is produced for winding the cable 14 on the drum 17. The quick winding of the cable in this manner will cause lever 13 (Figure 1) and associated parts to be actuated for withdrawing bolt 7.

After the shovel has been dumped, pipe 38 is opened to the atmosphere and, consequently, the springs 39 and 40 will quickly act to move the parts back to the position shown in Figure 3 while the usual mechanism for closing the shovel functions to produce that result. As indicated in Figure 2, live steam is continually in the pipe 41 so that when the parts are in the position shown in Figure 2, pipe 38 is in free communication with the flexible pipe 42, which flexible pipe is connected with the valve casing 43 and discharges into the passage-way 44, which in turn discharges through the passage-way 45 to the outlet opening 46. A valve member 47 is arranged in casing 43, said valve member having the passage-ways 44 and 45 formed therein. A cable 48 is connected to valve member 47 and when this cable is pulled, passage-way 45 will be moved over until it connects the pipe 49 with the pipe 41' whereupon live steam will immediately pass into the flexible pipe 42 and through pipe 38 into the cylinder 37. When the cable 48 is released, the springs 50 will function to move the valve member 44 back to its former position as shown in Figure 2. It will be noted that the springs 50 are connected to suitable fixed points and to a cross bar 51 connected with the valve member 47. It will also be noted that the springs 39 and 40 are connected to some fixed object at one end and at the opposite end are connected to projecting members 39' and 40' secured to the plate 27. The cable 48, as shown in Figure 8, extends around the pulley 52 and upwardly to arm 53, which arm is rigidly secured to the hinged section 54 of the lever 55. It will be noted that the hinge section 54 is rigidly connected at 56 to lever 45, the structure being such that when the lever is moved toward or away from the observer as the lever is used in Figure 8, section 54 will move on the lever 55 but when section 54 is swung at right angles as shown in dotted lines in Figure 8, lever 55 may be maintained stationary. It is to be understood that lever 55 is the usual lever now in common use on power shovels whereby the shovel mechanism is caused to function in the desired manner. From the description it will noted that the operator may stand near lever 55 and without shifting his position may actuate section 54 whereupon cable 48 will be pulled. This will result in the drum 17 and associated parts performing their usual function for releasing the bottom of the shovel 5. By shifting the section 54 back to its former position in alignment with the lever 55, drum 17 and associated parts will be released and the bottom of shovel 5 permitted to again move to a closed position.

It will also be noted that by the use of drum 17 and associated parts, including weight 27 and cable 23, the rope or cable 14 is maintained fairly taut so that when given a proper additional pull it will quickly release the bottom of shovel 5.

The above described arrangement permits all of the more delicate parts of the controlling mechanism to be housed in a protected position within the cab, with only the rugged drum shaft and associated devices exposed to the weather. The drums balance lateral stresses on the boom incidental to operating the tripping cable. These stresses are a material factor, especially when the latch has become jammed or rusted under the severe conditions of use and abuse to which the dippers are ordinarily subjected.

In Figures 9 and 10 will be seen a modified form of the invention which is capable of use on other forms of power shovels besides those operated by steam. In the construction shown in Figures 1 to 8 inclusive, the parts have been designed particularly for use on steam shovels but in the form shown in Figures 9 and 10, the device may be used on a shovel having as its principal power element a gasoline engine or electric motor. When either of these two power elements are used, certain parts are continually rotating and the chain 57 is operatively connected with one of the rotating parts so that it will be continually moving. This chain is fitted onto a sprocket wheel 58 so that as the chain continually moves, sprocket wheel 58 will continue to move. This sprocket wheel is rigidly secured to a shaft 59 supported in suitable journal members 60 and 61. A clutch member 62 is keyed or otherwise rigidly secured to the shaft 59 and continually operates therewith, said clutch member co-acting with a second clutch member 63 formed integral with or rigidly secured to a drum 64 which in turn is rigidly secured to or formed integral with the drum 65. These drums and clutch member 63 are all loosely mounted on shaft 59. It will be noted from Figure 10 that shaft 59 at one end is provided with a central bore and also provided with slots 66 and 67 through which a key 68 extends. The pressure member or shaft 69 is loosely mounted in the bore 70 of shaft 59, said pressure member or shaft being threaded at 71, said threaded portion fitting into a threaded hub 72 of a suitable bracket 73. An arm 74 is rigidly secured to the shaft 69 and is normally held in a given position by a spring 75. However, whenever the section 54 of lever 55 is moved to the dotted position shown in Figure 8, cable 48 will be pulled and arm 54 will be swung over against the action of spring 75, said movement being sufficient to cause the threaded portions 71 to move shaft 69 over a sufficient distance to shift the pulleys 64 and 65 and clutch member 63 so that this clutch member will operatively engage or clutch the clutch members 62 whereby the pulleys 64 and 65 will rotate with shaft 59. As soon as the section 54 has been released, spring 75 will quickly rotate shaft 69 so as to relieve the pressure thereon and immediately the clutch members 62 and 63 will become disengaged so that the pulleys will stop, though the clutch member 62, shaft 9 and sprocket wheel 58 will continue to rotate. In this construction, by shifting the arm 74 and associated parts, the drums are connected or disconnected with the power. The drums 64 and 65 function in a similar manner to drums 22 and 17 in the preferred form of the invention. When the parts are properly functioning, spring 18 not only acts to prevent accidental disengagement of the catch or bolt 7 but also acts to pull the trip cable 14 back to its former position after each time the shovel has been tripped. This action in pulling the cable 14 naturally causes the drums 17 and 22 to be rotated to a certain extent.

What I claim is:

1. A semi-automatic trip for power shovels, including a tripping mechanism having a tripping cable, a drum on which said cable is adapted to be wound, a second drum, a shaft on which the two drums are fixed, a cable connected with said second drum and adapted to be wound thereon, a weight acting on said second cable for holding the same under tension and for rotating both of said drums for maintaining the first mentioned cable under tension, power means engageable with the shaft intermediate the drums for rotating the latter for causing said tripping mechanism to function, and a manually actuated member for controlling said power means.

2. In a semi-automatic trip for power shovels, a tripping cable, a drum, a drum shaft thereon adapted to wind said tripping cable to cause the same to function, a second drum thereon, means acting on the second drum for causing the first drum to take up the slack in said cable, and hand controlled power means for actuating the drum shaft to cause said cable to produce a tripping action.

3. In a semi-automatic trip for power shovels, a trip cable, a drum for winding said trip cable so as to cause the same to function, a ratchet wheel connected with said drum, a rack adapted to rotate said ratchet wheel, a power member for actuating said rack, means associated with the rack for cushioning the blow of the rack against the ratchet wheel when the same is first engaged, and manually operated means for controlling said power member.

4. In a semi-automatic trip for power shovels, a tripping cable, a drum for winding said tripping cable to cause the same to function, a ratchet wheel secured to said drum, a rack normally out of engagement with said ratchet wheel, a power member for moving said rack into engagement with said ratchet wheel and continuing the movement until the ratchet wheel has been rotated sufficiently to cause the drum to wind said cable until it functions, a spring connection interposed between said power member and said rack whereby the rack yieldingly engages the ratchet wheel upon its first engagement, and manually operated means for controlling said power member.

5. In a semi-automatic trip for power shovels having a swinging control lever adapted to swing back and forth in a certain plane, a tripping cable, a drum for actuating said tripping cable, means including a power member for actuating said drum and means for controlling said power member, said last mentioned means including a lever member pivotally mounted on the first mentioned lever and acting as a section thereof, said lever member when functioning independently swinging in a plane at right angles to the first mentioned lever, a cable connected to said lever member and pulled thereby, and means for returning said cable when released.

6. The combination with an excavating machine including a boom, a dipper and a latch for opening the dipper, of semi-automatic trip mechanism for operating the latch, including a drum shaft mounted transversely on the boom, drums on opposite ends of the shaft, one of said drums carrying a cable for actuating the latch, the other of said drums carrying a tensioned cable for taking up the slack in the first mentioned cable, a ratchet wheel on the shaft between the drums, a power operated rack engageable with the ratchet wheel to rotate the drums and positively release the latch and manually operable means for controlling the power actuated rack.

GEORGE GEDEON MORIN.